(12) United States Patent
Bernosky et al.

(10) Patent No.: US 7,009,499 B2
(45) Date of Patent: Mar. 7, 2006

(54) VEHICLE ANTI-THEFT ENTRY SYSTEM

(75) Inventors: John David Bernosky, Ashland, PA (US); Nathan Houser, New Ringgold, PA (US)

(73) Assignee: Mack Trucks, Inc., Allentown, PA (US)

( * ) Notice: Subject to any disclaimer, the term of this patent is extended or adjusted under 35 U.S.C. 154(b) by 35 days.

(21) Appl. No.: 10/835,385

(22) Filed: Apr. 30, 2004

(65) Prior Publication Data

US 2005/0242920 A1 Nov. 3, 2005

(51) Int. Cl.
*B60R 25/10* (2006.01)
(52) U.S. Cl. .............................. 340/426.1; 340/426.28; 340/426.34; 340/426.36; 340/5.2; 340/5.24; 307/10.2
(58) Field of Classification Search ............ 340/426.1, 340/426.11, 426.14, 426.28, 426.34, 426.36, 340/5.2, 5.24; 307/10.1, 10.2
See application file for complete search history.

(56) References Cited

U.S. PATENT DOCUMENTS

| | | | |
|---|---|---|---|
| 4,233,642 A | 11/1980 | Ellsberg | |
| 4,335,370 A | 6/1982 | Scalley et al. | |
| 4,446,380 A | 5/1984 | Moriya et al. | |
| 4,463,340 A | 7/1984 | Adkins et al. | |
| 4,754,255 A | 6/1988 | Sanders et al. | |
| 4,888,575 A | 12/1989 | De Vaulx | |
| 5,006,843 A | 4/1991 | Hauer | |
| 5,045,837 A | 9/1991 | Gosker | |
| 5,138,986 A | 8/1992 | Aguilar | |
| 5,218,338 A | 6/1993 | Chang | |
| 5,431,244 A | 7/1995 | Possobom | |
| 5,635,901 A | 6/1997 | Weinblatt | |
| 5,821,631 A | 10/1998 | Loraas et al. | |
| 5,917,405 A * | 6/1999 | Joao | 340/426.17 |
| 6,018,291 A * | 1/2000 | Marble et al. | 340/426.12 |
| 6,023,219 A | 2/2000 | Lee | |
| 6,060,981 A | 5/2000 | Landes | |
| 6,084,317 A | 7/2000 | Wolfe et al. | |
| 6,198,996 B1 | 3/2001 | Berstis | |
| 6,236,120 B1 | 5/2001 | Loraas et al. | |
| 6,351,703 B1 | 2/2002 | Avery, Jr. | |
| 6,380,848 B1 | 4/2002 | Weigl et al. | |
| 6,876,293 B1 | 4/2002 | Frolov et al. | |
| 6,570,267 B1 | 5/2003 | Moriya et al. | |

\* cited by examiner

*Primary Examiner*—Davetta W. Goins
(74) *Attorney, Agent, or Firm*—Rothwell, Figg, Ernst & Manbeck, PC (57) ABSTRACT

A vehicle anti-theft entry system includes a keypad, a first and second indicator lights, and a theft deterrent module disposed in the vehicle. The theft deterrent module asserts the first indicator light and receives a PIN from the keypad. An access control module comparing the PIN to a list of codes. If the PIN matches a restricted code the access control module sends a restricted access code to the theft deterrent module, if the PIN matches an unrestricted code of the list of codes the access control module sends an unrestricted access code to the theft deterrent module, and if the PIN matches none of the list of codes the access control module sends a deny access code to the theft deterrent module. The theft deterrent module receives the access code and asserts the first indicator light and outputs deny data to control substantially a function of the vehicle if the access code is the deny access code. Otherwise the theft deterrent module asserts the second indicator light and outputs either restricted data to control substantially the function of the vehicle if the access code is the restricted access code, or unrestricted data to allow substantially the function of the vehicle if the access code is the unrestricted access code.

9 Claims, 5 Drawing Sheets

VEHICLE ANTI-THEFT ENTRY SYSTEM

BACKGROUND OF THE INVENTION

1. Field of the Invention

The invention relates to vehicle anti-theft entry system, and in particular, to vehicle anti-theft entry systems that are lower cost and somewhat less amenable to hacking.

2. Description of the Related Art

Vehicles, such as over-the-road trucks, are often operated in fleets. More than one individual may have access to a particular vehicle. Some individuals, such as the driver, may be authorized to drive the vehicle over a particular route, during a particular period of time, such as a shift, or within a particular zone or territory. Other individuals, such as shop or repair personnel, may have access to the vehicle that is limited to a particular range operation or a particular schedule of diagnostic operations or tests. Still other individuals, such as fleet owners or managers, may have relatively unfettered access to vehicles. Finally, people who lack authorization to operate fleet vehicles at all, such as thieves or hijackers, may have no rightful access to operate fleet vehicles.

Vehicles are often equipped with vehicle control modules. These control modules may take the form of computerized controls, such as engine or transmission controls. Some vehicles have anti-theft schemes whereby a prospective operator may is required to identify himself to the vehicle control module in order to gain access to the vehicle. The range of access an operator is given may depend on the identity of the operator. Often the port of point of access to the vehicle is a computer-like screen with a keyboard into which the prospective operator enters a personal identification number (PIN) or other user identification key.

Since the vehicle control module may possess significant computing power, different levels of access may be granted to various users based on their particular identity. The computer may also be equipped with user interfaces that make accessing the vehicle control module convenient and easy. Often, however, the computer capability of the vehicle control module inadvertently provides feed-back to an unauthorized user that may be used to gain entry to the vehicle. Such unauthorized users are analogous to "hackers" and may be able to understand and defeat the vehicles authorization system using information provided inadvertently or unknowingly by the vehicle authorization system itself. Furthermore, computer screens and feedback devices, although not very expensive, may still be reduced in cost. Since prices of mass-produced vehicles are under severe competitive pressure at all times, even a small cost reduction may be of significance in the marketplace.

SUMMARY OF THE INVENTION

A primary object of the invention is to overcome the deficiencies of the related art described above by providing a vehicle anti-theft entry system. The present invention achieves these objects and others by providing a vehicle anti-theft entry system.

In several aspects, the invention may provide a vehicle anti-theft entry system. In particular, in a first aspect, a vehicle anti-theft entry system includes a keypad, a first and second indicator lights, a theft deterrent module disposed in the vehicle, the theft deterrent module asserting the first indicator light and receiving a PIN from the keypad, an access control module having a list of codes, the access control module receiving the PIN from the theft deterrent module and comparing the PIN to the list of codes, the access control module sending a restricted access code to the theft deterrent module if the PIN matches a restricted code of the list of codes, the access control module sending an unrestricted access code to the theft deterrent module if the PIN matches an unrestricted code of the list of codes, and the access control module sending a deny access code to the theft deterrent module if the PIN matches none of the list of codes, the theft deterrent module receiving the access code, the theft deterrent module asserting the first indicator light and outputting deny data to control substantially a function of the vehicle if the access code is the deny access code, the theft deterrent module asserting the second indicator light and outputting restricted data to control substantially the function of the vehicle if the access code is the restricted access code, and the theft deterrent module asserting the second indicator light and outputting unrestricted data to allow substantially the function of the vehicle if the access code is the unrestricted access code.

In a second aspect, a method of communication for a vehicle anti-theft entry system includes asserting a first indicator light of a theft deterrent module, receiving a PIN from a keypad of the theft deterrent module, comparing the PIN to the list of access codes, sending a restricted access code to the theft deterrent module if the PIN matches a restricted code of the list of access codes, sending an unrestricted access code to the theft deterrent module if the PIN matches an unrestricted code of the list of codes, and sending a deny access code to the theft deterrent module if the PIN matches none of the list of codes, the theft deterrent module receiving the access code, the theft deterrent module asserting the first indicator light and outputting deny data to control substantially a function of the vehicle if the access code is the deny access code, the theft deterrent module asserting the second indicator light and outputting restricted data to control substantially the function of the vehicle if the access code is the restricted access code, and the theft deterrent module asserting the second indicator light and outputting unrestricted data to allow substantially the function of the vehicle if the access code is the unrestricted access code.

In a third aspect, a system for communication for a vehicle anti-theft entry system includes means for asserting a first indicator light of a theft deterrent module, means for receiving a PIN from a keypad of the theft deterrent module, means for comparing the PIN to the list of access codes, means for sending a restricted access code to the theft deterrent module if the PIN matches a restricted code of the list of access codes, means for sending an unrestricted access code to the theft deterrent module if the PIN matches an unrestricted code of the list of codes, and means for sending a deny access code to the theft deterrent module if the PIN matches none of the list of codes, means for receiving the access code, means for asserting the first indicator light and outputting deny data to control substantially a function of the vehicle if the access code is the deny access code, means for asserting the second indicator light and outputting restricted data to control substantially the function of the vehicle if the access code is the restricted access code, and means for asserting the second indicator light and outputting unrestricted data to allow substantially the function of the vehicle if the access code is the unrestricted access code.

The above and other features and advantages of the present invention, as well as the structure and operation of various embodiments of the present invention, are described in detail below with reference to the accompanying drawings.

BRIEF DESCRIPTION OF THE SEVERAL VIEWS OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Owners or managers of fleets of vehicles may be concerned about their vehicles being stolen while the vehicles are in the field. Since an unauthorized user may use information derived from an anti-theft system itself to defeat the system, it would be desirable if information supplied to a potential operator of a vehicle were limited to that necessary for one trained in the use of the vehicle. Since words or symbols displayed on a computer screen may provide information an unauthorized user might use to defeat an anti-theft system, it would be desirable if feedback to a potential vehicle operator were conveyed by a single dichromic light or a pair of monochromic lights flashing intermittently.

Anti-theft devices for vehicles have become more sophisticated as more technically complex computers have become available. There may be a tendency to equip sophisticated anti-theft devices with displays of commensurate technical sophistication. Displays, such as light emitting diode (LED), liquid crystal displays (LCD), or cathode ray tube (CRT) displays, provide information to a prospective user of a vehicle with prompts and feed-back. A hacker, however, can use the information displayed by an anti-theft device to assess the progress being made toward breaking into a vehicle protected by the anti-theft device. It may be desirable to use a single dichromic light or a pair of monochromic lights instead of a display to limit the information the system divulges, in a manner analogous to packing the tumblers of a safe lock in a vacuum bottle to limit the tactile feedback provided to a safe-cracker. Even labeling lights 'run' and 'error' may be giving away too much information.

Since audible tones or patterns of responses may provide information useful to an unauthorized user to defeat an anti-theft system it would be desirable if a single dichromic light or a pair of monochromic lights flashed intermittently to indicate the need to enter a code. Since an unauthorized user may use information derived from an anti-theft system itself to achieve a limited level of access, it would be desirable to be able to re-verify an operator's identity during vehicle operation, especially if a higher level of access became necessary. Since an authorized user trained to operate a vehicle ought to require less feedback from an anti-theft system in order to gain access to a vehicle, it would be desirable if the information reporting progress towards gaining access to the vehicle were conveyed by a single dichromic light or a pair of monochromic lights, to limit the information available to those who are not authorized to operate the vehicle.

Since the meaning of a flashing light may not be apparent to an operator who is unfamiliar with the operation of the vehicle, such as an unauthorized user, it would be desirable if the information from the anti-theft system were conveyed by simple flashing lights. Since an unauthorized user may be able to discern the meaning of words or symbols displayed on a computer screen, or tones emanating from speakers associated with an anti-theft system, it would be desirable if the information from the anti-theft system were conveyed by simple flashing lights.

Since an unauthorized user may not understand the meaning of a request for information after access to the vehicle has been gained, it would be desirable if a single dichromic light or a pair of monochromic lights flashed at predetermined interval to indicate the operator of the vehicle must re-enter a code, or enter a new code, if heightened capabilities, such as larger service radius, are requested/required. Since an unauthorized user may not understand the meaning of a further request for information, it would be desirable if the meaning of a single dichromic light or a pair of monochromic lights flashing intermittently was not immediately apparent to an operator who was not familiar with the vehicle, i.e. an unauthorized user.

Since an authorized user doesn't need a red light to flash initially to know a code may be necessary to start the engine, it may be desirable to limit prompts supplied to potential operators of a vehicle. If a running vehicle were hijacked, it would be desirable for a single dichromic light or one of a pair of monochromic lights to flash periodically, prompting driver to prove authorization over again. In one embodiment, a single dichromic light or one of a pair of monochromic lights would flash periodically to indicate the need to re-enter an identification in the manner of a 'dead-man' switch on a locomotive.

Figure 1:
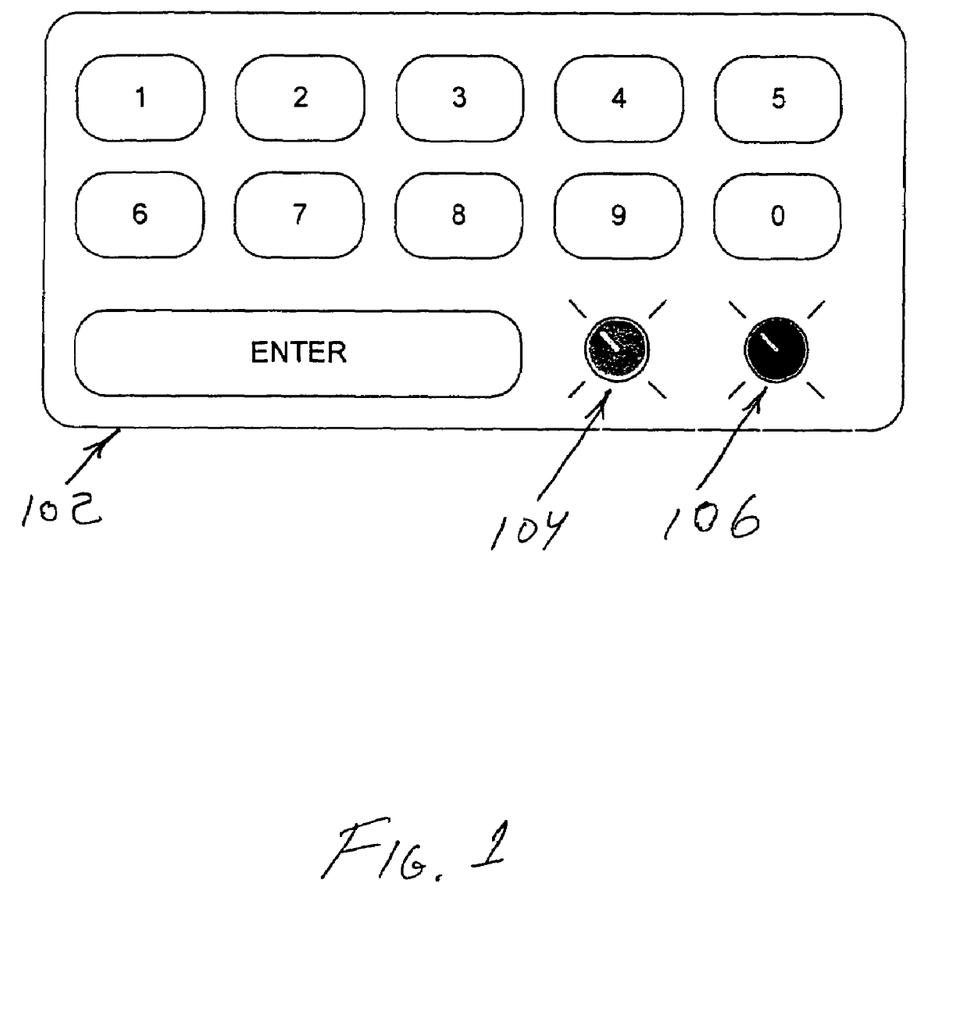
FIG. 1 is a keypad and indicator lights for use with an embodiment of the invention.

In FIG. 1 is shown a key pad 102 for use with a vehicle anti-theft entry system according to an embodiment of the invention. Keypad 102 may include a first and second indicator lights 104, 106. In one embodiment, first indicator light 104 or second indicator light 106 may be single dichromic lights, that is, lights providing two alternate colors, one of which may be substantially darkness. In another embodiment, first indicator light 104 or second indicator light 106 may be monochromic lights, that is, lights providing two alternate colors, one of which may be substantially darkness. First and second indicator lights 104 and 106 may also produce several shades of light that mix to form substantially a single color or a narrow range of colors as well.

Figure 2:
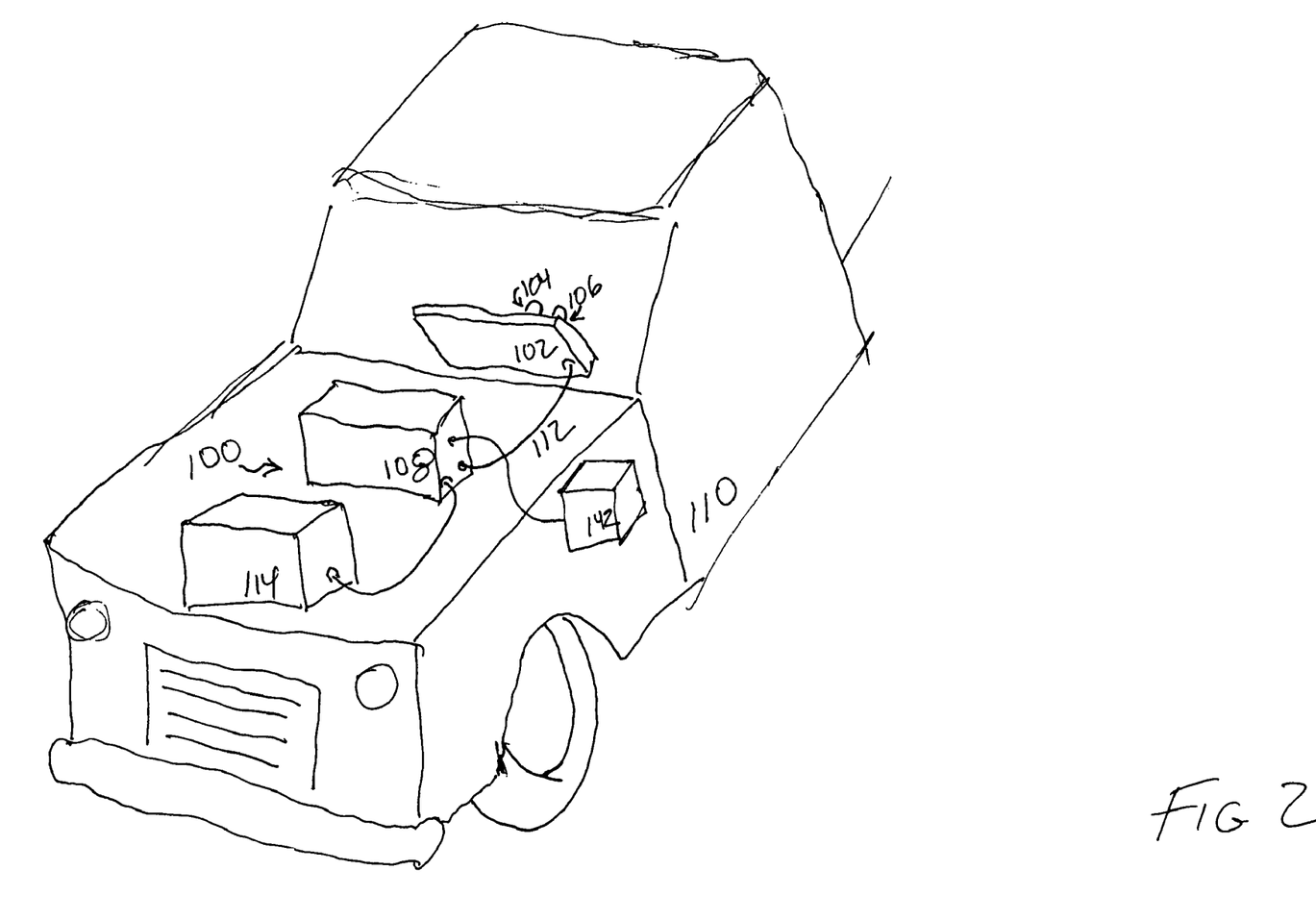
FIG. 2 is a vehicle anti-theft entry system according to a first embodiment of the invention.

In FIG. 2 is shown a vehicle anti-theft entry system 100 according to a first embodiment of the invention. Vehicle anti-theft entry system 100 may be installed in a vehicle 110 to deter or prevent theft or unauthorized use of vehicle 110. Vehicle anti-theft entry system 100 may include a theft deterrent module 108 and an access control module 114. In one embodiment, theft deterrent module 108 and access control module 114 are implemented as separate components coupled communicably or operatively together. In other embodiments, theft deterrent module 108 and access control module 114 are combined as a unitary component, or implemented as separate functions of a single component.

Theft deterrent module 108 may assert first or second indicator lights 104, 106 when proof of an identity of a prospective operator of vehicle 110 is required. Proof of the identity of a prospective operator of vehicle 110 may be required before access has been granted to vehicle 110, at various intervals after access has been granted, or when access wider than that which was granted initially is sought.

The prospective operator of vehicle 110 may input a string of numbers at keyboard 102. If the string of numbers corresponds to a PIN 112, theft deterrent module 108 may receive the PIN 112 from keypad 102. In an alternative embodiment, theft deterrent module 108 may also receive the string of numbers from keypad 102 even if they do not constitute PIN 112, but that outcome is not necessarily significant. Individual operators may be assigned a PIN 112 on the basis of their identity, such as the driver of vehicle 110, or on their membership in a group, such as a pool of mechanics assigned to service vehicle 110.

Figure 3:
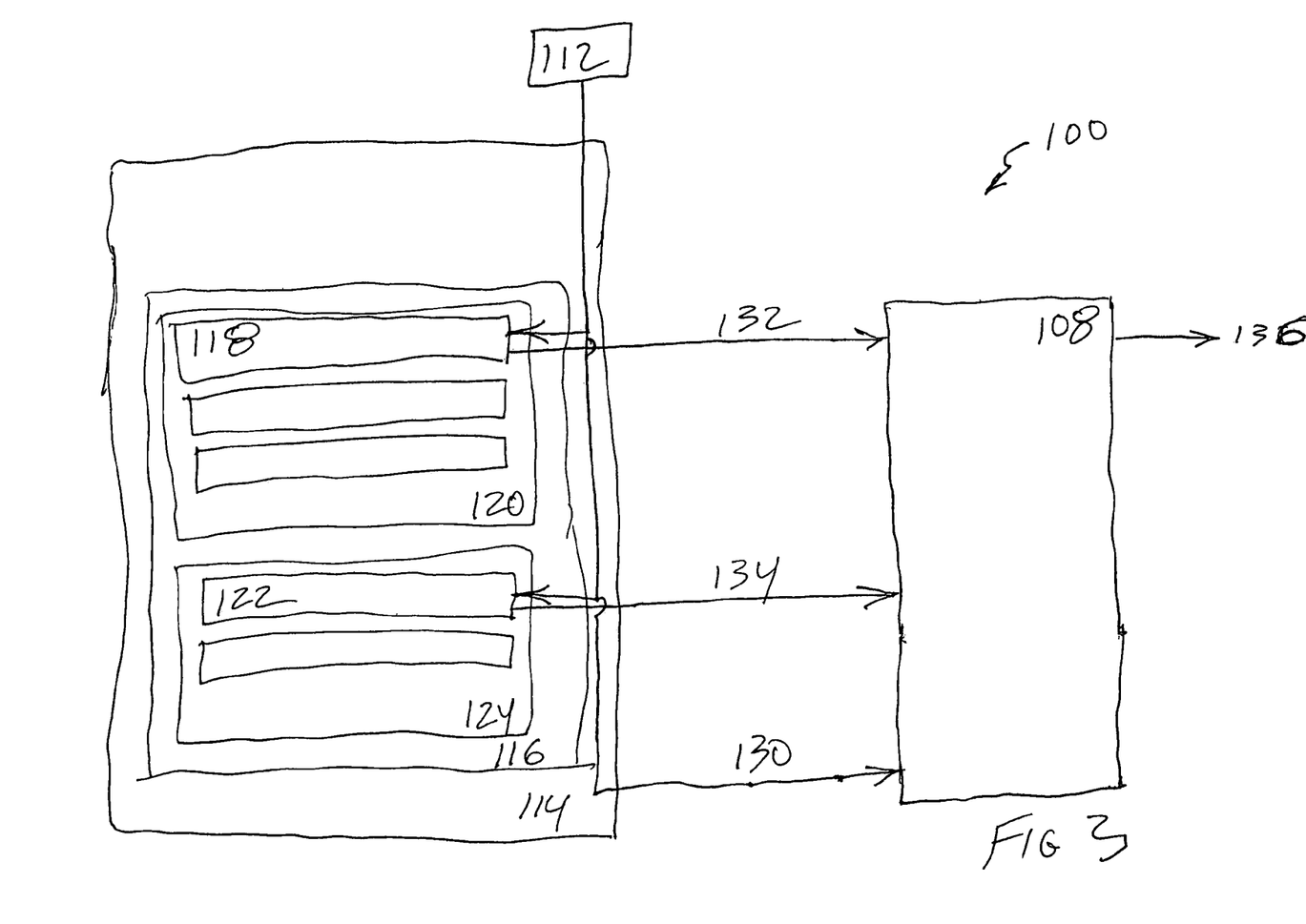
FIG. 3 is an access control module for use with an embodiment of the invention.

As shown in FIG. 3, access control module 114 may have a list of codes 116 with which to test the legitimacy of PIN 112. Access control module 114 may receive PIN 112 from theft deterrent module 108 and compare PIN 112 to list of codes 116. List of codes 116 may be stored in access control module and may be updated at regular intervals, or when theft deterrent module 108 is thought to have been compromised in some manner.

Access control module 114 compares PIN 112, or an analogy thereof, such as an electronic signal proportionate to a value of PIN 112, to one or another of the codes on list of codes 116. Among the codes stored in list of codes 116 may be restricted codes 120 and unrestricted codes 124. Restricted access code 118 may be assigned to a mechanic who needs to operate vehicle 110 in the vicinity of a shop or repair facility, or over the road while conducting an established diagnostic routine. There may be several ranges of access associated with different codes among the set of restricted codes 120. Unrestricted access code 122 may be assigned to an owner of vehicle 110 or a manager of a fleet containing vehicle 110.

If PIN 112 matches a one of restricted codes 120 of list of codes 116, access control module 114 may send a restricted access code 118 to theft deterrent module 108. In one embodiment, restricted access code 118 one of several similar restricted codes 120. In this embodiment access control module 114 may be analogized to a filter. If PIN 112 matches restricted access code 118, access control module 114 outputs restricted data 132 to control substantially a function 136 of vehicle 110, and theft deterrent module 108 asserts first or second indicator lights 104, 106.

In several embodiments, vehicle function 136 may be the operation of vehicle 110 itself, or it may be operation of a door or window lock, a transmission lock, a horn, including activating bells, whistles, sirens, audible warnings, anti-noise, such as a complement of ambient noise, or a brake application.

If PIN 112 matches one of unrestricted codes 124 of list of codes 116, access control module 114 may send an unrestricted access code 122 to theft deterrent module 108. In one embodiment, unrestricted access code 122 may be one of several similar unrestricted access codes 122, such as separate unrestricted access codes 122 assigned to different individuals. This may allow, for example, the unrestricted access codes 122 assigned to a particular individual to be rescinded without changing the access allowed to other holders of unrestricted access codes 122. If PIN 112 matches unrestricted access code 122, access control module 114 outputs unrestricted data 134 to allow substantially function 136 of vehicle 110, and theft deterrent module 108 asserts first or second indicator lights 104, 106. In the event that PIN 112 matches both one of restricted codes 120 and one of unrestricted codes 124, access control module 114 may default to the level of access allowed by restricted access code 118, and send that to theft deterrent module 108.

If theft deterrent module 108 receives deny data 130, theft deterrent module 108 may assert first or second indicator lights 104, 106. In one embodiment, neither first nor second indicator lights 104, 106 provide sufficient information to an unauthorized user to deduce a PIN 112 matching either restricted code 120 or unrestricted code 124.

If PIN 112 matches none of list of codes 116, access control module 114 may send deny data 130 to theft deterrent module 108 to control substantially a function 136 of vehicle 110. In one embodiment, deny data 130 causes function 136 to be substantially deterred. This may be the case if function 136 is operation of vehicle 110 itself. In another embodiment, deny data 130 may cause function 136 to be asserted. This may be the case if function 136 is operation of a door lock or a horn.

An individual who types in a PIN 112 that matches none of list of codes 116 may be assumed to not be authorized to operate vehicle 110. Such an individual may be required in this case to verify their identity to a person responsible for vehicle 110 in order to be granted a PIN 112 that matches either restricted code 120 or unrestricted code 124.

Figure 4:
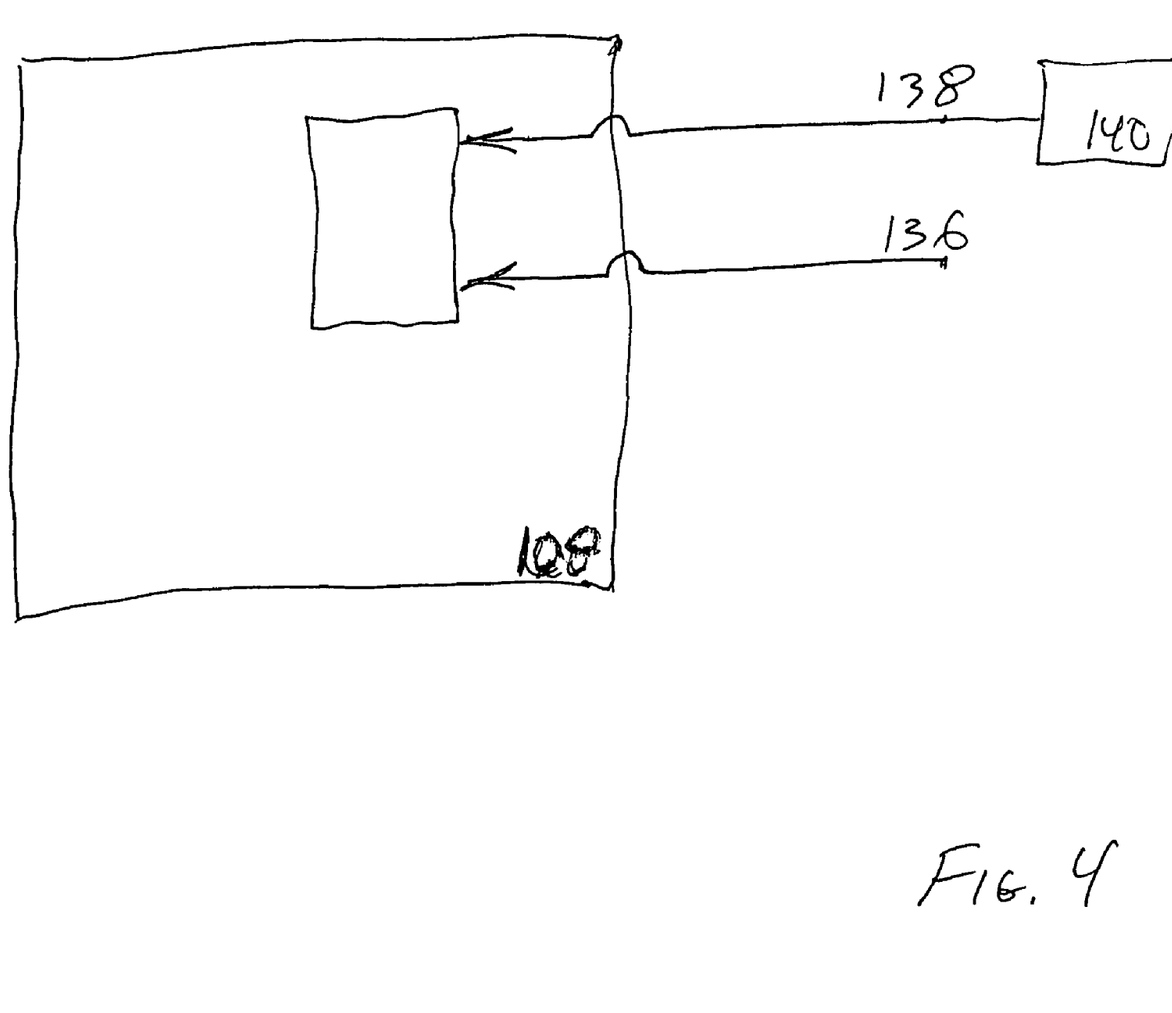
FIG. 4 is a vehicle anti-theft entry system according to a second embodiment of the invention.

In a second embodiment, shown in FIG. 4, theft deterrent module 108 may also record second data 138 substantially analogous to an operating parameter 140 of vehicle 110 and compare second data 138 to function 136 of vehicle 110. In several embodiments, vehicle operating parameter 140 may be a duration of engine operation, a distance traveled, an engine speed, a speed of vehicle 110, such as a governed speed, a wheel speed, a location of vehicle 110, a range, such as a limited range, a fuel consumption, such as a rate of fuel consumption or a quantity of fuel available to be consumed, an acceleration, such as an engine output or a clutch or fluid coupling torque limit, or a location, such as a proximity to a shop or a warehouse or a geographic area. Theft deterrent module 108 may assert second indicator light 106 and output restricted data 132 to control substantially function 136 of vehicle 110 if PIN 112 matches restricted access code 118 and second data 138 exceeds a limit associated with function 136 of vehicle 110.

In one embodiment, referring again to FIG. 2, vehicle anti-theft entry system 100 may include a Global Positioning System (GPS) receiver 142. In this embodiment, GPS receiver 142 may be associated with theft deterrent module 108. GPS receiver 142 may be used to track second data 138 and see if it exceeds a limit associated with function 136 of vehicle 110 if, for example, vehicle operating parameter 140 is a location of vehicle 110 and PIN 112 matches restricted access code 118.

Figure 5:
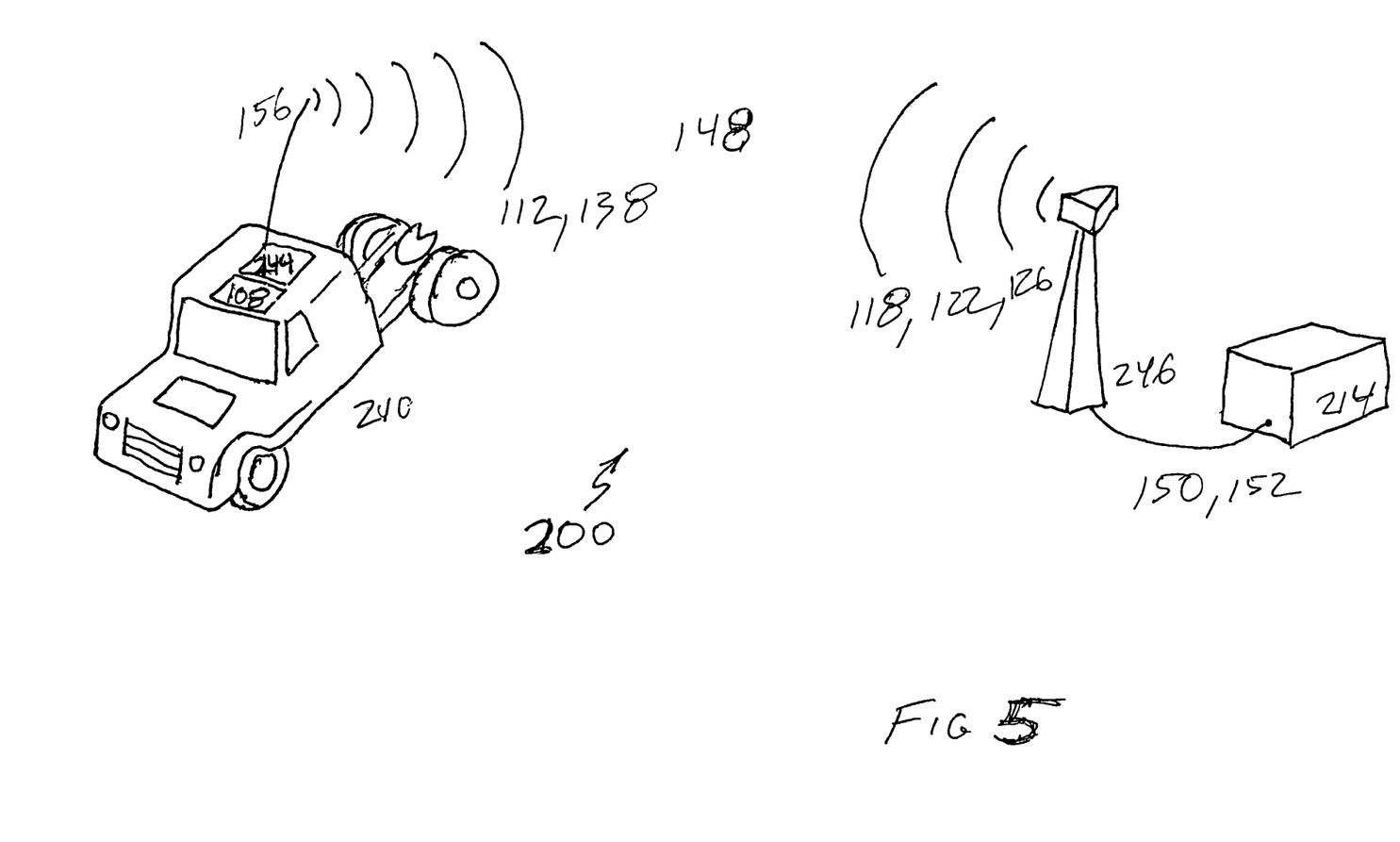
FIG. 5 is a vehicle anti-theft entry system according to a third embodiment of the invention.

In a third embodiment, shown in FIG. 5, vehicle anti-theft entry system 200 may include a first transceiver 244 disposed in vehicle 210 and connected communicably to theft deterrent module 108. A second transceiver 246 may be connected communicably to access control module 214. First transceiver 244 may receive PIN 112 from theft deterrent module 108 and send PIN 112 to second transceiver 246. Second transceiver 246 receives restricted access code 118 from access control module 114 if PIN 112 matches a restricted code 120 and sends restricted access code 118 to first transceiver 244. Second transceiver 246 receives unrestricted access code 122 from access control module 114 if PIN 112 matches unrestricted code 124 and sends unrestricted access code 122 to first transceiver 244. Second transceiver 246 receives deny access code 126 from access control module 114 if PIN 112 matches none of list of codes 116 and sends deny access code 126 to first transceiver 244 if PIN 112 matches none of list of codes 116.

In one embodiment, both of first and second transceivers 244, 246 may be disposed in vehicle 210. This would be the case if, for example, theft deterrent module 108 and access control module 114 are also disposed in vehicle 210. In this case first and second transceivers 244, 246 may be interfaces to a bus, such as a vehicle bus.

In another embodiment, second transceiver 246 may be disposed at a location 150 remote from vehicle 210. In this embodiment, access control module 114 may also be disposed at location 150, although it could be disposed in vehicle 210 as well. A base station 152 or other means of maintaining access to vehicle 210 may be disposed at location 150 to send and receive access codes 128 to vehicle 210. Base station 152 may also receive second data 138 and see if it exceeds a limit associated with function 136 of vehicle 210.

In one embodiment second transceiver 246 may be connected communicably to first transceiver 244 over a channel 148. In several embodiments, channel 148 may be a wireless channel 148, a cellular phone channel 148, a satellite link, a SAE J1708/J1587 channel 148, a radio channel 148, a microwave channel 148, or an IEEE 802.11b channel 148. In one embodiment, theft deterrent module 108 may be capable of being upgraded to newer versions without a substantial redesign of the unit by sending software over channel 148.

In several embodiments, channel 148 over which second transceiver 246 communicates with first transceiver 244 may be a wireless channel, a cellular phone channel, a satellite link, a Society of Automotive Engineers (SAE) J1708/J1587 channel, a radio channel, a microwave channel, or an Institute of Electrical and Electronics Engineers (IEEE) 802.11b channel. In one embodiment, a portion of channel 148 may be a hardwired channel, such as a coaxial cable running from base station 152 to a repeater. In another embodiment, base station 152 may be associated with a Wide Area Network (WAN), a portion of which may be hardwired. In several embodiments, data transfer over channel 148 may be done by Satellite data upload via a Qualcomm® system, or a wired data upload via a six pin in-cab diagnostic connector.

In one embodiment, first transceiver 244 may be a short range radio frequency (RF) wireless data modem (SR-WDM). In this embodiment, channel 148 may consist of a bi-directional wireless transfer of data between an electronic system of vehicle 110, such as theft deterrent module 108, and base station 152. In one embodiment, the wireless transfer method may be a RF based digital system. In one embodiment, a protocol such as IEEE 802.11b may be used.

In one embodiment, theft deterrent module 108 may interface with an on-board data bus of vehicle 110. In one embodiment, theft deterrent module 108 may be compatible with an SAE J1708/J1587 format. In one embodiment, theft deterrent module 108 may support off-board RF based wireless communications using Dynamic Host Configuration Protocol (DHCP). In one embodiment, off-board communications may be via an integrated IEEE 802.11b data transceiver.

In one embodiment, first transceiver 244 may include an antenna 156. Antenna 156 may be mounted externally to improve system performance. In this embodiment, antenna 156 may be connected to first transceiver 244 via a Bayonet Nut Connector (BNC) connector.

In one embodiment, base station 152 may periodically verify an integrity of theft deterrent module 108. This may include verification of access to on-board data bus 154, correct performance of first transceiver 244, or access to off-board data servers. The scheduling of these checks may be adjustable via software running on base station 152.

In one embodiment, vehicle anti-theft entry system 100 may have a limited amount of software resident on theft deterrent module 108, with the majority of the software be "web" resident on base station 152. This may be the case if on-board complexity is to be minimized. In one embodiment, theft deterrent module 108 may be a "thin client".

In a fourth embodiment, a method of communication for a vehicle anti-theft entry system 100 may include the steps of asserting a first indicator light 104 of a theft deterrent module 108, receiving a PIN 112 from a keypad 102 of theft deterrent module 108, comparing PIN 112 to list of access codes 116, sending a restricted access code 118 to theft deterrent module 108 if PIN 112 matches a restricted code 120 of list of access codes, sending an unrestricted access code 122 to theft deterrent module 108 if PIN 112 matches an unrestricted code 124 of list of codes 116, and sending a deny access code 126 to theft deterrent module 108 if PIN 112 matches none of list of codes 116, theft deterrent module 108 receiving access code 116, theft deterrent module 108 asserting first indicator light 104 and outputting deny data 130 to control substantially a function 136 of vehicle 110 if access code 116 is deny access code 126, theft deterrent module 108 asserting second indicator light 106 and outputting restricted data 132 to control substantially function 136 of vehicle 110 if access code 116 is restricted access code 118, and theft deterrent module 108 asserting second indicator light 106 and outputting unrestricted data 134 to allow substantially function 136 of vehicle 110 if access code 116 is unrestricted access code 122.

An example of an implementation of a Theft Deterrent PIN Entry Module (TD Module) according to an embodiment of the invention follows below. The TD Module may be a simple entry device constructed without a graphic or text display and utilizing two 'low cost' and 'low power' indicator lights. Current methods of vehicle theft prevention use a vehicle computer or display device to provide a significant amount of features not needed by those fleets interested only in preventing theft of the vehicle. The 'low cost' and 'low power' indicator lights, along with an audible alarm, could provide the feedback necessary for the driver to successfully enter an approved PIN number and gain access to the operation of the vehicle.

In this embodiment, the TD Module may be integrated into an existing Vehicle Control System. The TD Module could easily be tailored for use with any vehicle configuration utilizing a theft algorithm and manual driver entry device. Upon receiving a request to operate the vehicle, the theft deterrent algorithm may send a message to the TD Module requesting the driver identification. Upon receipt of this message, the TD Module may begin flashing the red light at a 60 Hz frequency. The request message may specify the number of digits that the algorithm expects in return.

The driver can then enter the appropriate PIN number in the TD Module. Once the last number is entered, the TD Module may send the driver identification code to the Vehicle Control System which may compare it to a list of accepted codes. If the code matches one of the approved codes, a validation message may be sent to the TD Module, and vehicle operation is altered based on the access level associated with the code stored and the algorithm terminates.

The algorithm may be activated upon a power reset during engine operation. Once the engine has been shutdown as a result of the algorithm operation because of an elapsed time or distance traveled. Upon entry of an invalid ID, a flag may be set which may prevent the engine from starting until a valid driver ID is entered.

The system can be used to set various access levels to the vehicle. The following levels can be accessed using the theft deterrent algorithm:

Full access—no restrictions on vehicle operation
Limited Fuel—limitation of engine load to a quantity determined by the fleet data file.
Limited Speed—limitation of vehicle speed to a quantity determined by the fleet data file.
Theft—no restrictions on vehicle operation beyond the data file restrictions during a time period and for a distance determined by the fleet data file.

When the vehicle is started and theft deterrence is enabled, the following message may be sent via J1587 from the Vehicle Control System to the TD Module:

142 254 171 76 n a b CKSM

Where:
n is the number of bytes to follow,
a is the length of the theft password string,
b is the number of attempts remaining,
CKSM is checksum.

The variables a and b have special cases that the TD Module must recognize in addition to the definitions above. These are:
If a>0 and b=255 then this is a first time access request.
If a=0 and b=255 then access is approved.
If a>0 and b=0 then access is denied, and the operator may be instructed to try again.
If a=0 and b=0 then access is denied, and no more attempts are allowed.

After the TD Module receives the Vehicle Control System request, it may send an acknowledgment (ACK) message (MID 142, PID 254, Code 75), where MID is message identification, and which is described below.

171 254 142 75 n a . . . a CKSM

Where
n is the number of bytes to follow,
a . . . a is the theft password string.

For an ACK message, n=0 and the theft password string is NULL.

After sending the ACK, the TD Module must decide what to do next based on the values of a and b in the original request from the Vehicle Control System.

If a>0 and b>0 then this may be a first time access request. The TD Module may flash the "red light" at a 60 Hz rate. As long as the last character has not yet been entered by the driver, the ACK message may be sent to the Vehicle Control System every two seconds. The ACK message continues to be sent until the driver completes entry or the Vehicle Control System interrupts with another Code 76 message. If a Code 76 message is sent, the TD Module must evaluate a and b and proceed. If the Vehicle Control System does not respond in 35 seconds, the TD Module may turn on the red light and leave it on until the problem is fixed or power is turned off.

When the driver enters the final character, the TD Module sends the complete theft password string to the Vehicle Control System via a Code 75 message (described above) and ceases flashing the "red light". The Vehicle Control System responds with a Code 76 message; the TD Module must evaluate a and b and proceed. If the Vehicle Control System does not respond in five seconds, the TD Module may turn on the red light and leave it on until the problem is fixed or power-off.

If a=0 and b=255 then access to the vehicle may be approved, and the TD Module may cease flashing the red light. The TD Module may turn the green light on for a period of 10 seconds and then turn off the green light.

If a>0 and b=0 then, access to the vehicle may be denied, and the TD Module may instruct the operator to try again by turning the red light on solid for three seconds until the 'Enter' key is pressed. Upon pressing the 'enter' key, the TD Module may return to step 1.

If a=0 and b=0 then access to the vehicle may be denied, and the TD Module may turn the red light on solid and trigger Alarm A until power-off. All key input is disabled.

The foregoing has described the principles, embodiments, and modes of operation of the present invention. However, the invention should not be construed as being limited to the particular embodiments described above, as they should be regarded as being illustrative and not restrictive. It should be appreciated that variations may be made in those embodiments by those skilled in the art without departing from the scope of the present invention.

While the invention has been described in detail above, the invention is not intended to be limited to the specific embodiments as described. It is evident that those skilled in the art may now make numerous uses and modifications of and departures from the specific embodiments described herein without departing from the inventive concepts.

While various embodiments of the present invention have been described above, they should be understood to have been presented by way of examples only, and not limitation. Thus, the breadth and scope of the present invention should not be limited by the above described embodiments.

Obviously, numerous modifications and variations of the present invention are possible in light of the above teachings. It is therefore to be understood that the invention may be practiced otherwise than as specifically described herein.

What is claimed is:

1. A vehicle anti-theft entry system comprising:
a keypad;
a first and second indicator lights;
a theft deterrent module disposed in said vehicle, said theft deterrent module asserting said first indicator light and receiving a PIN from said keypad;
an access control module having a list of codes, said access control module receiving said PIN from said theft deterrent module and comparing said PIN to said list of codes, said access control module sending a restricted access code to said theft deterrent module if said PIN matches a restricted code of said list of codes, said access control module sending an unrestricted access code to said theft deterrent module if said PIN matches an unrestricted code of said list of codes, and said access control module sending a deny access code to said theft deterrent module if said PIN matches none of said list of codes;
said theft deterrent module receiving said access code, said theft deterrent module asserting said first indicator light and outputting deny data to control substantially a function of said vehicle if said access code is said deny access code;
said theft deterrent module asserting said second indicator light and outputting restricted data to control substantially said function of said vehicle if said access code is said restricted access code; and said theft deterrent module asserting said second indicator light and outputting unrestricted data to allow substantially said function of said vehicle if said access code is said unrestricted access code.

2. The vehicle anti-theft entry system of claim 1, wherein said vehicle function is selected from the group consisting of:
a speed,
a range,
a fuel consumption,
an acceleration,
a location,
a horn,
an engine output, and
a brake application.

3. The vehicle anti-theft entry system of claim 1, comprising further:
recording second data substantially analogous to an operating parameter of said vehicle;
comparing said second data to said function of said vehicle; and
said theft deterrent module asserting said second indicator light and outputting said restricted data to control substantially said function of said vehicle if said access code is said restricted access code said second data exceeds a limit associated with said function of said vehicle.

4. The vehicle anti-theft entry system of claim 3, wherein said vehicle operating parameter is selected from the group consisting of:
a duration of engine operation,
a distance traveled,
an engine speed,
a vehicle speed,
a wheel speed, and
a vehicle location.

5. The vehicle anti-theft entry system of claim 1, comprising further a GPS receiver.

6. The vehicle anti-theft entry system of claim 1, comprising further:
a first transceiver disposed in said vehicle and connected communicably to said theft deterrent module;
a second transceiver connected communicably to said access control module;
said first transceiver receiving said PIN from said theft deterrent module and sending said PIN to said second transceiver;
said second transceiver receiving said restricted access code from said access control module if said PIN matches a restricted code and sending said restricted access code to said first transceiver, said second transceiver receiving said unrestricted access code from said access control module if said PIN matches said unrestricted code and sending said unrestricted access code to said first transceiver, and said second transceiver receiving said deny access code from said access control module if said PIN matches none of said list of codes and sending said deny access code to said first transceiver if said PIN matches none of said list of codes.

7. The vehicle anti-theft entry system of claim 1, wherein said second transceiver is connected communicably to said first transceiver over a channel selected from the group consisting of:

a wireless channel,
a cellular phone channel,
a satellite link,
a SAE J1708/J1587 channel,
a radio channel,
a microwave channel, and
an IEEE 802.11b channel.

8. A method of communication for a vehicle anti-theft entry system comprising:
asserting a first indicator light and a second indicator light of a theft deterrent module;
receiving a PIN from a keypad of said theft deterrent module;
comparing a PIN to said list of access codes;
sending a restricted access code to said theft deterrent module if said PIN matches a restricted code of said list of access codes;
sending an unrestricted access code to said theft deterrent module if said PIN matches an unrestricted code of said list of codes; and
sending a deny access code to said theft deterrent module if said PIN matches none of said list of codes;
said theft deterrent module receiving said access code, said theft deterrent module asserting said first indicator light and outputting deny data to control substantially a function of said vehicle if said access code is said deny access code;
said theft deterrent module asserting said second indicator light and outputting restricted data to control substantially said function of said vehicle if said access code is said restricted access code; and
said theft deterrent module asserting said second indicator light and outputting unrestricted data to allow substantially said function of said vehicle if said access code is said unrestricted access code.

9. A system for communication for a vehicle anti-theft entry system comprising:
means for asserting a first indicator light and a second indicator light of a theft deterrent module;
means for receiving a PIN from a keypad of said theft deterrent module;
means for comparing a PIN to said list of access codes;
means for sending a restricted access code to said theft deterrent module if said PIN matches a restricted code of said list of access codes;
means for sending an unrestricted access code to said theft deterrent module if said PIN matches an unrestricted code of said list of codes; and
means for sending a deny access code to said theft deterrent module if said PIN matches none of said list of codes;
means for receiving said access code,
means for asserting said first indicator light and outputting deny data to control substantially a function of said vehicle if said access code is said deny access code;
means for asserting said second indicator light and outputting restricted data to control substantially said function of said vehicle if said access code is said restricted access code; and
means for asserting said second indicator light and outputting unrestricted data to allow substantially said function of said vehicle if said access code is said unrestricted access code.

* * * * *